J. B. STINE.
Improvement in Machines for Stripping Broom-Corn.
No. 131,718.                      Patented Sep. 24, 1872.
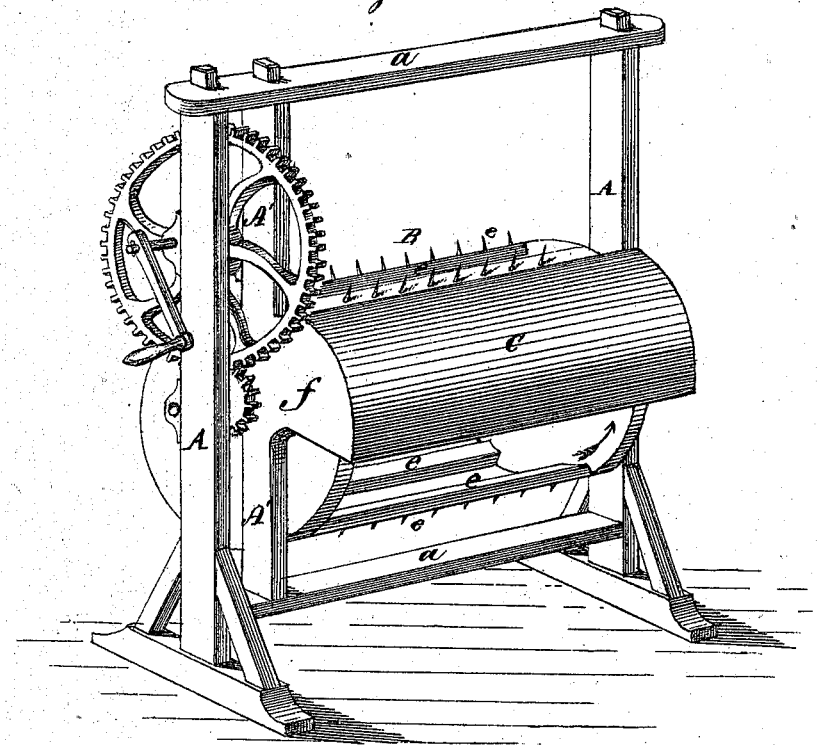
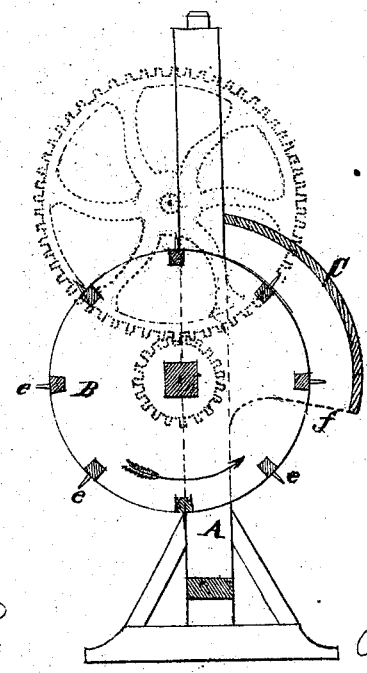

UNITED STATES PATENT OFFICE.

JOHN B. STINE, OF ROHRERSVILLE, MARYLAND.

IMPROVEMENT IN MACHINES FOR STRIPPING BROOM-CORN.

Specification forming part of Letters Patent No. 131,718, dated September 24, 1872.

*To all whom it may concern:*

Be it known that I, JOHN B. STINE, of Rohrersville, in the county of Washington and State of Maryland, have invented certain Improvements in Machines for Stripping Broom-Corn, of which the following is a specification, reference being had to the accompanying drawing.

My invention relates to machines for stripping broom-corn of its seed; and the invention consists in arranging a cylinder with a concave in such a manner that the brush can have its seed stripped off without breaking or injuring the brush as much as by the machines heretofore used, all as hereinafter more fully explained.

Figure 1 is a perspective view of my improved machine; Fig. 2 is a transverse vertical section of the same.

In the manufacture of brooms from broom-corn the brush, as it is termed, has first to be prepared by removing therefrom the mass of seeds which grow upon and adhere to it. This is done in various ways: generally, where any considerable quantity is prepared, it is accomplished by the use of a machine operating on the plan of a thrashing-machine. In such cases a cylinder armed with teeth or small spikes is used, with a solid bed near its under or upper side, the brush in small quantities being held by the hand and thrust in between the revolving cylinder and bed. When the side next the cylinder is cleaned of its seed it is withdrawn, turned over, and the other side scraped in the same way. With such machines the brush is subject to injury and waste. As the brush is supported on an unyielding bed, it follows that the teeth of the cylinder, cut, tear, or break off a good deal of the finest parts of the brush, which is really the most valuable for the desired purpose of making brooms. It is also quite liable, when thus caught by the teeth of the cylinder, to be pulled out of the hand of the operator, and be drawn through between it and the bed, thus crushing and destroying it. It also frequently happens that, in the effort to prevent this, the operator's hand is drawn into the machine and fearfully lacerated by the teeth of the cylinder.

To obviate these difficulties is the object of my present invention, and to accomplish it I make my machine as follows: I provide a suitable frame, A *a*, and mount therein a cylinder, B, which is armed with rows of teeth *e*, as shown in Figs. 1 and 2. This cylinder may be of any desired size, and consists of a solid drum, or a skeleton frame with transverse bars, as represented in the drawing. In rear of this cylinder I secure to brackets *f*, rigidly attached to the frame, a concave cover or shield, C, which extends upward over the top to about the center of said cylinder, as shown in Figs. 1 and 2, and which should extend below far enough to fully protect the operator. This cylinder may be driven by any suitable power, but should be so geared as to revolve with considerable velocity. In the drawing it is represented as arranged for hand use, it being operated by a gear-wheel with a crank attached, which is ample for the use of those raising but a small crop. Where, however, it is to be used on a larger scale, it will be driven by horse-power, steam, or some similar motor.

The manner of using the machine is as follows: The operator, standing behind the concave shield C, takes up a bunch of the corn or brush in his hands, and, holding it firmly by the butts, rests it upon the top of the shield with the seed end protruding over in front. As the cylinder revolves its teeth come rapidly in contact with the seed, and whip or scrape them off, the brush being turned over as soon as one side is thus cleaned of its seed and the other side cleaned in the same manner. The seed end of the brush, thus being left free, and not confined between the cylinder and a bed, as generally done, is much less torn and injured, and the seed is whipped off without tearing, crushing, and breaking the brush. If any of the brush is pulled from the hand it is simply thrown over to the front, from whence it can be gathered up uninjured. At the same time all danger of injuring the hand by drawing it into the machine is fully avoided.

I am aware that machines have been used for hackling and dressing hemp and flax similar in principle to mine—that is, in having the ends of the fiber or material acted on by a drum armed with teeth or knives, while projecting or hanging over the upper edge of a shield attached to the frame—this, therefore, I do not claim, broadly; but what I propose to claim as my invention, is the improved construction and arrangement of parts composing the same, for the purpose specified.

Having thus described my invention, what I claim is—

The machine for stripping broom-corn, herein described and shown, consisting of the frame A $a$, upright A′, revolving cylinder B, provided with transverse toothed bars $e$, the brackets $f$, concave rest and shield C, and actuating mechanism, when said parts are constructed, combined, and arranged for operation, substantially as described and set forth.

JOHN B. STINE.

Witnesses:
   PHIL. T. DODGE,
   W. C. DODGE.